United States Patent
O'Neill et al.

(10) Patent No.: US 9,472,822 B2
(45) Date of Patent: Oct. 18, 2016

(54) FUEL CELL POWER PLANT CONTROL

(75) Inventors: Jonathan Daniel O'Neill, Manchester, CT (US); Timothy W. Patterson, Jr., West Hartford, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/005,762

(22) PCT Filed: Mar. 29, 2011

(86) PCT No.: PCT/US2011/030242
§ 371 (c)(1),
(2), (4) Date: Sep. 17, 2013

(87) PCT Pub. No.: WO2012/134442
PCT Pub. Date: Oct. 4, 2012

(65) Prior Publication Data
US 2014/0011108 A1    Jan. 9, 2014

(51) Int. Cl.
*H01M 8/06* (2016.01)
*H01M 8/04* (2016.01)
*G05F 1/575* (2006.01)

(52) U.S. Cl.
CPC ............ *H01M 8/0488* (2013.01); *G05F 1/575* (2013.01); *H01M 8/0491* (2013.01); *H01M 8/04589* (2013.01); *H01M 8/04977* (2013.01); Y02E 60/50 (2013.01)

(58) Field of Classification Search
CPC ............ G05F 1/575; H01M 8/04589; H01M 8/0488; H01M 8/0491; H01M 8/04977; Y02E 60/50
USPC ................ 429/427, 428, 429, 430, 431, 432
See application file for complete search history.

(56) References Cited

U.S. PATENT DOCUMENTS

| | | | |
|---|---|---|---|
| 4,988,283 A | 1/1991 | Nagasawa et al. | |
| 2003/0211372 A1 | 11/2003 | Adams et al. | |
| 2009/0104489 A1* | 4/2009 | Shin ................... | H01M 8/0234 429/413 |
| 2010/0028729 A1* | 2/2010 | Billups et al. ................. | 429/13 |
| 2011/0008697 A1 | 1/2011 | Nielsen et al. | |
| 2011/0076582 A1* | 3/2011 | Zhang et al. ................ | 429/432 |

FOREIGN PATENT DOCUMENTS

| | | |
|---|---|---|
| EP | 1 263 070 A2 | 12/2002 |
| JP | 64-12465 A | 1/1989 |
| JP | 1-200567 A | 8/1989 |
| JP | 2-193537 A | 7/1990 |
| JP | 2000-133279 A | 5/2000 |
| JP | 2005093282 | 4/2005 |
| JP | 2007-299647 A | 11/2007 |
| WO | 89/06866 A1 | 7/1989 |
| WO | 2010065017 | 6/2010 |

OTHER PUBLICATIONS

Extended European Search Report, mailed Sep. 3, 2014, for European Application No. 11862396.6-1807 / 2691828, 5 pages.
International Search Report and Written Opinion for International Application No. PCT/US2011/030242 dated Mar. 27, 2012.

* cited by examiner

*Primary Examiner* — Patrick Ryan
*Assistant Examiner* — Ben Lewis
(74) *Attorney, Agent, or Firm* — Seed IP Law Group PLLC

(57) ABSTRACT

An example method of controlling a fuel cell power plant based on provided power includes selectively varying an electrical resistance of the variable resistive device responsive to at least one of a power provided by the fuel cell power plant, a current provided by the fuel cell power plant, or a voltage decay rate.

21 Claims, 2 Drawing Sheets

FUEL CELL POWER PLANT CONTROL

TECHNICAL FIELD

This disclosure relates to controlling a fuel cell power plant based on electrical power provided by the fuel cell power plants.

DESCRIPTION OF THE RELATED ART

Fuel cell power plants are well known. Cell stack assemblies and other known components operate in a known manner to provide electrical power. The applications for fuel cell power plants vary. Depending on the installation, different features and functions are required of different fuel cell power plants.

Cells in the fuel cell power plants have a voltage. Carbon in the cells can corrode at relatively high voltages. Platinum in the cells can dissolve at relatively high voltages. Some fuel cell power plant assemblies include a voltage limiting device that limits, or clips, the voltage of the cells. Limiting the voltage reduces carbon corrosion and platinum dissolution. While that approach has proven useful, there are limitations.

For example, voltage limiting devices tend to be designed for one particular type of fuel cell power plant and for only one operating condition. Additionally, if the voltage limit is too low, the fuel cell stack assembly will be less efficient, especially at the beginning of the life of the fuel cell stack assembly before the fuel cell stack experiences much decay.

SUMMARY

An example fuel cell power plant control arrangement includes a cell stack assembly that provides a flow of electric power. A variable resistive device is operationally associated with the cell stack assembly. The variable resistive device has a selectively variable electrical resistance. A controller automatically selects the electrical resistance of the resistive device to maintain a current of the electric power or a power level of the electric power at a desired level.

Another example fuel cell power plant control arrangement includes a cell stack assembly that provides electrical power, and a sensor device configured to sense a power level of the power. A variable resistive device is operationally associated with the cell stack assembly. The variable resistive device has a selectively variable electrical resistance. A controller controls the electrical resistance of the resistive device to maintain the power at a desired level.

An example method of controlling a fuel cell power plant based on provided power includes selectively varying an electrical resistance of the variable resistive device responsive to at least one of a power provided by the fuel cell power plant, a current provided by the fuel cell power plant, or a voltage decay rate.

Various features and advantages will become apparent to those skilled in the art from the following detailed description. The drawings that accompany the detailed description can be briefly described as follows.

DETAILED DESCRIPTION

Figure 1:
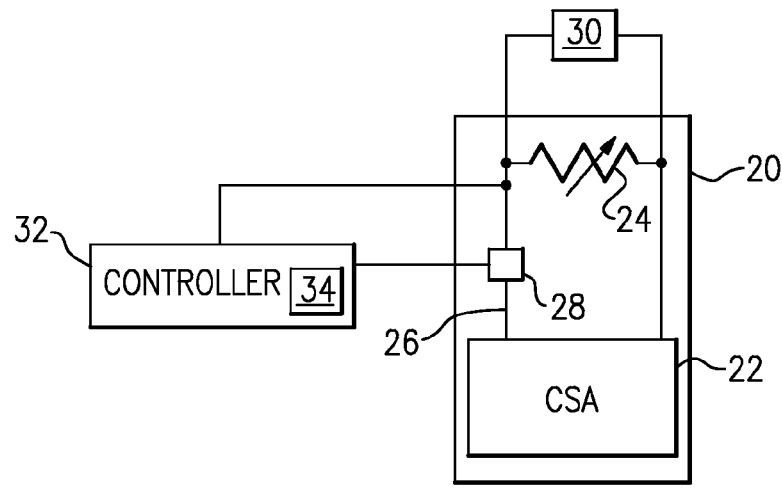
FIG. 1 schematically shows selected portions of an example fuel cell power plant that provides a flow of electrical power.

FIG. 1 schematically shows selected portions of an example fuel cell power plant 20, including a cell stack assembly (CSA) 22 and a variable resistive device 24. In this example, the CSA 22 is operationally associated with the variable resistive device 24. The CSA 22 provides electrical power along a path 26 to a battery 30, for example, in a known manner. The variable resistive device 24 is arranged in parallel with the electrical power provided to the battery 30 along the path 26.

In this example, a sensor 28 is configured to sense a current level of the power provided along the path 26. The current sensed by the sensor 28 is the sum of the current provided to the variable resistive device 24 and to the battery 30. A person skilled in the art and having the benefit of this disclosure would understand how to sense the current level using the sensor 28. As will be explained, some examples may not include the sensor 28.

The example sensor 28 is configured to communicate with a controller 32. In this example, the controller 32 selectively controls the electrical resistance of the variable resistive device 24 responsive to the current level sensed by the sensor 28. More specifically, the controller 32 compares the current level sensed by the sensor 28 to a threshold current value, and then, if needed, adjusts the current level to meet or exceed the threshold current value. The controller 32 adjusts the current level by changing the electrical resistance of the variable resistive device 24, for example. Because the current sensed by the sensor 28 is the sum of the current provided to the variable resistive device 24 and to the battery 30, the total current provided by the CSA 22 will not drop below the threshold current value.

A memory portion 34 of the controller 32 stores the threshold current value in one example. The example memory portion 34 also includes a database or information such as a look-up table that includes corresponding resistance values that should be selected by the controller 32 to achieve a desired current adjustment, for example.

In another example, the controller 32 selectively controls the electrical resistance of the variable resistive device 24 responsive to a power level calculated by the controller 32 based on voltage and current information provided by appropriate sensors. The controller 32 may compare the calculated power level to a threshold power level stored in memory portion 34.

Notably, the current level and the calculated power level are not direct operating conditions of the CSA 22, but are instead characteristics of the power provided by the CSA 22.

Figure 2:
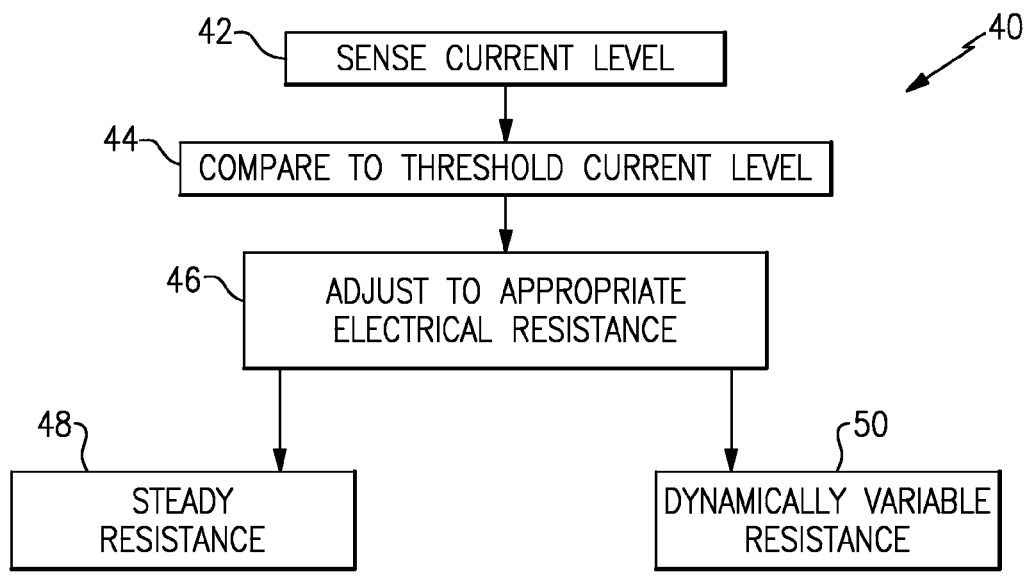
FIG. 2 is a flow chart diagram summarizing one example control approach involving maintaining a current level of the electrical power in FIG. 1.

FIG. 2 includes a flowchart diagram of a control method 40 summarizing one example approach that an example controller 32 utilizes for selecting an appropriate electrical resistance of the variable resistive device 24. In this example, the method 40 includes a step at 42 where the controller 32 determines the current level of the current moving from the CSA 22 along the path 26. At step 44, the controller 32 compares the sensed current level to the threshold current value. Depending on the difference between the sensed current level and the threshold current value, the controller 32 may adjust the electrical resistance of the variable resistive device 24 at a step 46. The controller 32 adjusts the electrical resistance so that the sensed current level meets or exceeds the threshold current value.

In one specific example, the threshold current value is 60 mA/cm$^2$ and the sensed current value 55 mA/cm$^2$. After making a comparison at the step 44, the controller 32 sends a control signal to the variable resistive device that decreases the electrical resistance of the variable resistive device until the sensed current value meets or exceeds 60 mA/cm$^2$. Other examples may include threshold current values between 10 and 50 mA/cm$^2$.

In the illustrated example, the controller 32 has the ability to control the electrical resistance of the variable resistive device 24 in a plurality of different manners. As schematically shown at 48, the electrical resistance may be selected and maintained at a steady value to change the sensed current level. Alternatively, as schematically shown at 50, the controller 32 dynamically varies the electrical resistance to change the sensed current level.

Figure 3:
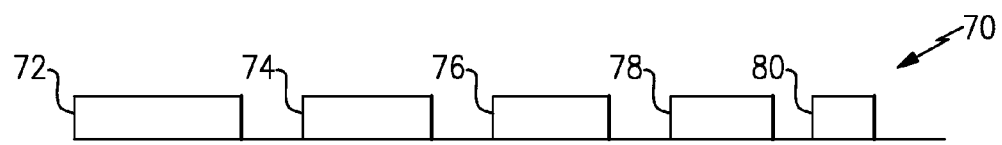
FIG. 3 is a timing diagram showing one example control signal used in the FIG. 2 control approach.

In one example, the controller 32 uses a control signal to selectively vary the electrical resistance of the variable resistive device. In an illustrated example schematically shown in FIG. 3, a control signal 70 comprises a plurality of pulses 72, 74, 76, 78, 80, etc. In this example, the controller 32 uses pulse width modulation on the control signal 70 to selectively vary the electrical resistance provided by the variable resistive device 24.

Figure 4:
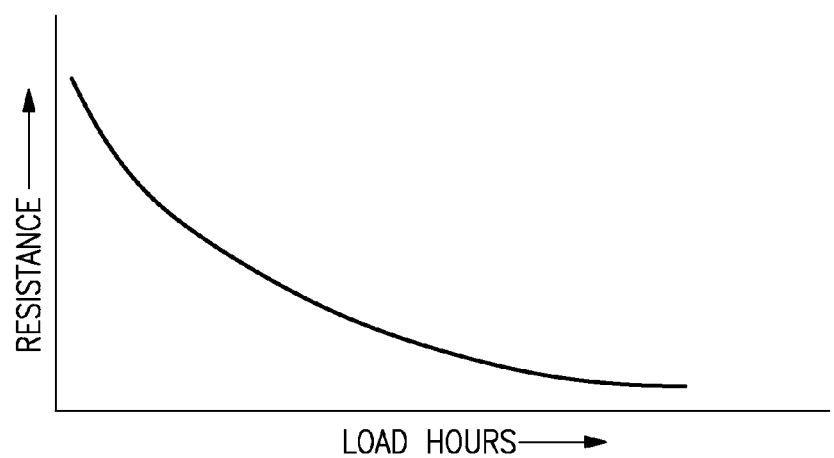
FIG. 4 graphically shows the electrical resistance over the life of the FIG. 1 fuel cell power plant.
Figure 5:
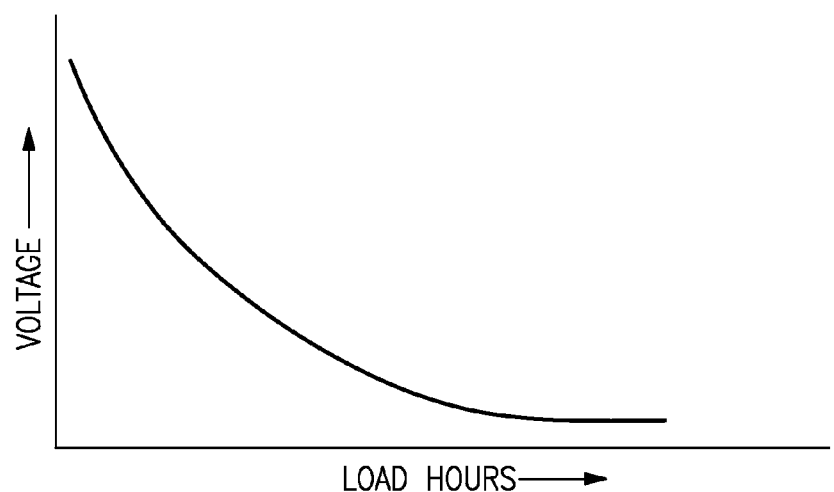
FIG. 5 graphically shows the voltage decay over the life of the FIG. 1 fuel cell power plant.

The pulses 72-80 in the example control signal have a gradually shorter on-time. As can be appreciated, and as shown graphically in FIG. 4, selectively varying the duty cycle of the control signal 70 in this way decreases the electrical resistance of the variable resistive device 24 over the life of the power plant 20. Notably, the decrease in the electrical resistance is proportional to a voltage decay model of the CSA 22.

The controller 32, in one example, executes a program stored in the memory portion 34. The program gradually decreases the resistance in response to loadhours, rather than in response to changes in current or voltage provided by the CSA 22. In such an example, the controller 32 is programmed to gradually decrease the resistance in a manner that tracks a typical voltage decay for the CSA 22. The controller 32 would not need to rely on the sensor 28, but would instead automatically decrease the resistance.

In one example, the variable resistive device 24 comprises a resistor and a plurality of switches such as MOSFETs that are arranged to respond to a control signal from the controller 32 such that operating the different switches based upon the selected pulse width modulation achieves the desired resistance provided by the variable resistive device 24. Given this description, those skilled in the art will be able to select an appropriate variable resistive device and an appropriate control arrangement to meet their particular needs.

Features of the disclosed examples include controlling the resistance within a CSA so that the CSA provides a minimum current or a minimum power. In the disclosed examples, maintaining the minimum current or the minimum power is more efficient than clipping the voltage within the CSA, for example.

The preceding description is exemplary rather than limiting in nature. Variations and modifications to the disclosed examples may become apparent to those skilled in the art. The scope of legal protection can only be determined by studying the following claims.

We claim:

1. A fuel cell power plant, comprising:
   a cell stack assembly that provides a flow of electric power;
   a variable resistive device operationally associated with the cell stack assembly, the variable resistive device having a selectively variable electrical resistance; and
   a controller that automatically selects the electrical resistance of the resistive device to maintain a current of the flow of electrical power at an operating level based on a comparison of the current to a threshold current value stored in memory, wherein the threshold current value is between 10 and 50 mA/cm$^2$.

2. The fuel cell power plant of claim 1, wherein the controller is configured to select the electrical resistance responsive to a condition that is not a direct operating condition of the cell stack assembly.

3. The fuel cell power plant of claim 1, wherein the variable resistive device is electrically coupled with the cell stack assembly.

4. The fuel cell power plant of claim 1 wherein the controller is configured to automatically select the electrical resistance of the resistive device to maintain the current of the flow of electrical power at an operating level above the threshold current value.

5. The fuel cell power plant of claim 1 wherein the controller is configured to maintain the electrical resistance at a steady value.

6. The fuel cell power plant of claim 1 wherein the controller is configured to use pulse width modulation to selectively vary the electrical resistance.

7. The fuel cell power plant of claim 1 wherein the controller is configured to dynamically vary the electrical resistance.

8. A fuel cell power plant, comprising:
   a cell stack assembly that provides a flow of electric power;
   a sensor device configured to sense the flow of electric power;
   a variable resistive device operationally associated with the cell stack assembly, the variable resistive device having a selectively variable electrical resistance; and
   a controller that controls the electrical resistance of the resistive device to maintain the flow of electric power at an operating level based on a comparison of the flow of electric power to a threshold electric power stored in memory.

9. The fuel cell power plant of claim 8, wherein the controller is configured to decrease the selected electrical resistance as the cell stack assembly decays.

10. The fuel cell power plant of claim 8, wherein the controller is configured to select the electrical resistance responsive to a condition that is not a direct operating condition of the cell stack assembly.

11. The fuel cell power plant of claim 8, wherein the variable resistive device is electrically coupled with the cell stack assembly.

12. The fuel cell power plant of claim 8 wherein the controller is configured to maintain the electrical resistance at a steady value.

13. The fuel cell power plant of claim 8 wherein the controller is configured to use pulse width modulation to selectively vary the electrical resistance.

14. The fuel cell power plant of claim 8 wherein the controller is configured to dynamically vary the electrical resistance.

15. A method of controlling a fuel cell power plant, the method comprising:
   selectively decreasing an electrical resistance of a variable resistive device responsive to a number of load-hours operated by the fuel cell power plant, wherein the decreasing tracks a voltage decay for the fuel cell power plant.

16. The method of claim 15 wherein selectively decreasing the electrical resistance includes using pulse width modulation to decrease the electrical resistance.

17. A method comprising:
   controlling an electrical resistance of a variable resistor of a cell stack assembly of a fuel cell power plant to maintain a current of a flow of electric power generated by the cell stack assembly at an operating level based on a comparison of the current to a threshold current value between 10 and 50 mA/cm$^2$.

18. The method of claim 17 wherein the controlling includes controlling the electrical resistance to maintain the current above the threshold current value.

19. The method of claim 17 wherein the controlling includes maintaining the electrical resistance at a steady value.

20. The method of claim 17 wherein the controlling includes using pulse width modulation to selectively vary the electrical resistance.

21. The method of claim 17 wherein the controlling includes dynamically varying the electrical resistance.

\* \* \* \* \*